Sept. 28, 1937.  T. GANNESTAD  2,094,066
CONE VALVE
Filed Aug. 20, 1936  2 Sheets-Sheet 1
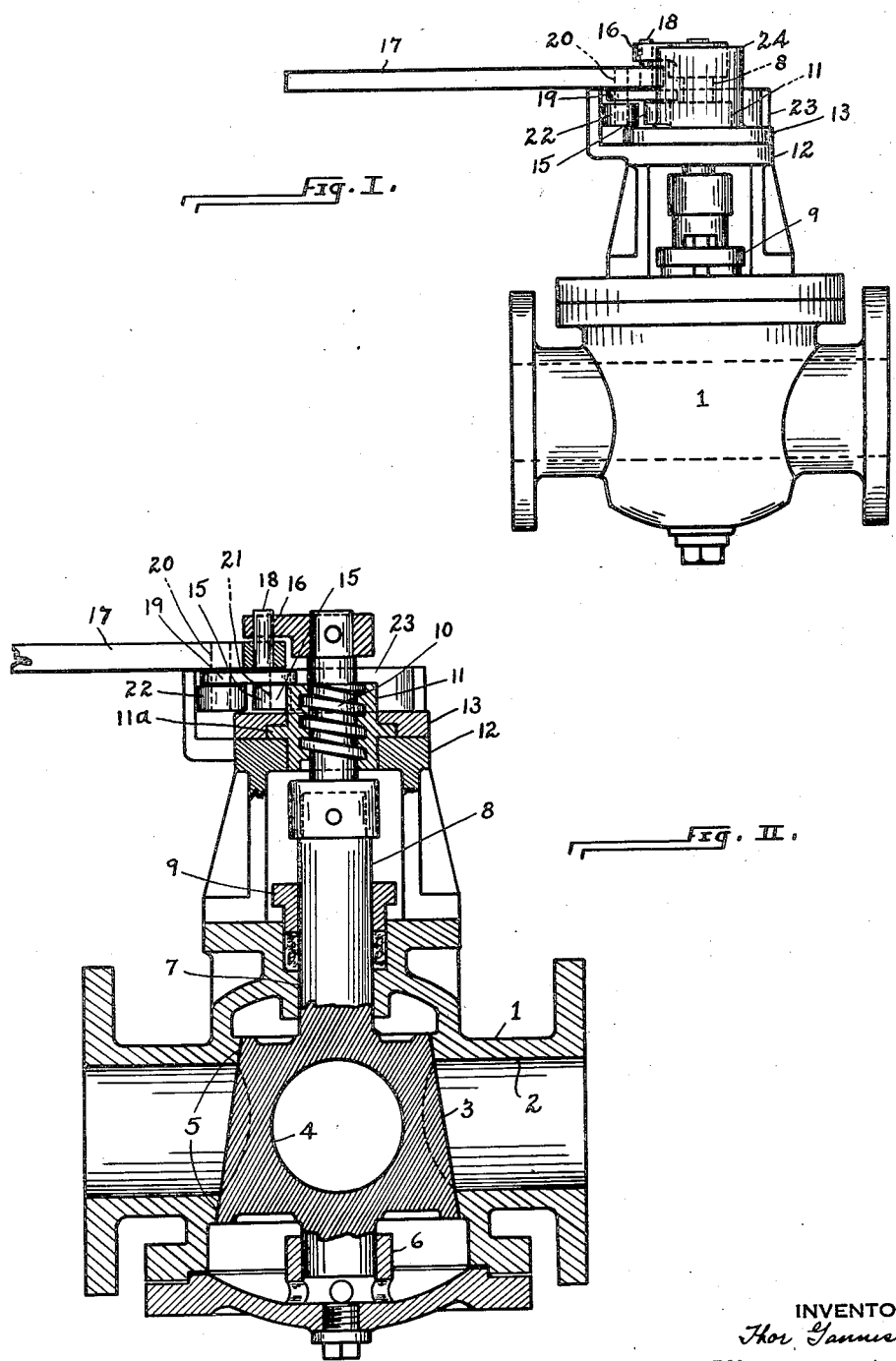

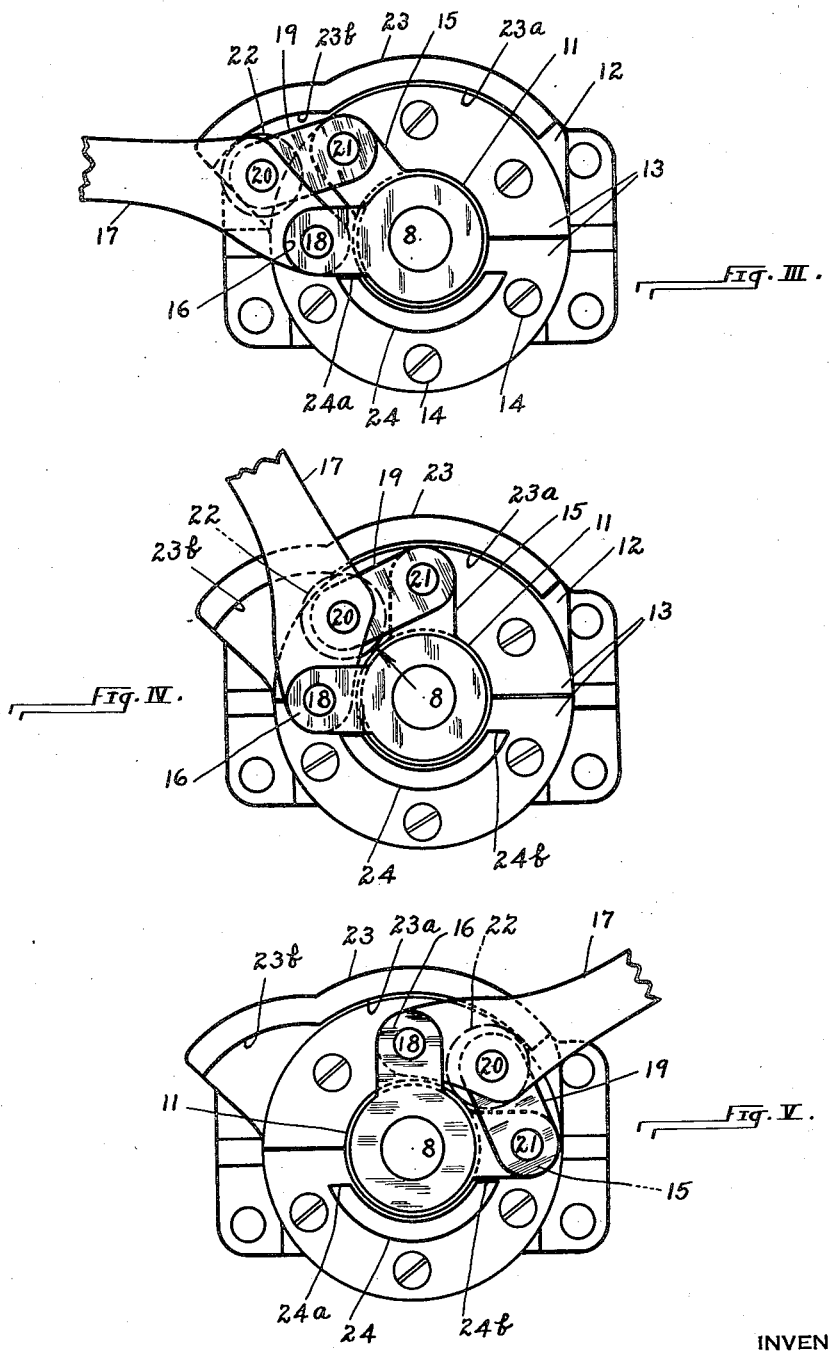

Patented Sept. 28, 1937

2,094,066

UNITED STATES PATENT OFFICE 2,094,066

CONE VALVE

Thor Gannestad, Pittsburgh, Pa.

Application August 20, 1936, Serial No. 96,990

7 Claims. (Cl. 251—97)

My invention relates to valves, particularly to cone valves for controlling flow through a conduit, valves of the sort having a ported plug which is rotatable between open and closed positions.

The ported plug is of frusto-conical form, and in closed position is secured tightly against a tapered seat in the body of the valve. In opening the valve the plug is first shifted axially away from its seat and then rotated, and thus it will be understood that the operation of the valve involves both rotation and axial adjustment of the plug.

More particularly, my invention lies in a particularly effective mechanism for operating a valve of this sort—mechanism which affords relatively great mechanical advantage in operating the valve, and which is inexpensive to construct, efficient and durable in service.

In the accompanying drawings Fig. I is a view in side elevation of a valve embodying the invention; Fig. II is a view of the valve in vertical section and to larger scale; Fig. III is a view in plan of the operating mechanism of the valve, shown to still larger scale; and Figs. IV and V are views comparable with Fig. III, illustrating particular elements of the operating mechanism in successive positions of service.

Referring to Figs. I and II of the drawings, the reference numeral 1 is applied to the body of the valve which is adapted to be included in a conduit (not shown) for fluid. A tapered valve member or conical plug 3 is arranged in body 1 in known way, to control flow through passage 2 and through the conduit in which the valve is installed. The plug 3 includes a transverse port 4 which is shown in Fig. II in one of its alternate positions of service—in closed position. The plug is supported for rotation in bearings 6 and 7; the bearing 6 is enclosed within body 1, and the usual valve stem 8, extending through bearing 7, is sealed by means of a packing gland 9. In closed position the plug 3 tightly engages a tapered seat 5 in the body 1, and, in opening the valve, the valve stem 8 is first shifted axially inward (downward in Fig. II), to free the plug from its seat, and then rotated through ninety degrees, whereby the plug is turned into such position that its port 4 extends in substantial alignment with passage 2. In closing the valve, the opposite movements are effected—the stem is first rotated through ninety degrees and then axially shifted outward (upward in Fig. II). As already mentioned the invention consists in means for so operating the valve.

As shown in Fig. II, the valve stem 8 carries integrally, or is connected to, a threaded portion 10, and a rotary, internally threaded nut 11 engages the threads of portion 10. The nut 11 is secured against axial movement in an operating head 12 which is integrated with valve body 1, and the mechanism of the invention is adapted first to rotate the nut (while the valve stem 8 is held stationary) and axially shift the stem 8 downward, and then to rotate the nut and stem in unison through ninety degrees. Manifestly, these movements of the parts are effective to adjust the valve plug 3 in the desired manner, mentioned above. And it will be manifest that, alternately, the rotary nut may be externally threaded and arranged in threaded engagement with the operating head 12 and secured against axial movement upon the stem 8. In either case, the relative, then the common, rotation of the nut and valve stem will effect the desired operation of the valve plug 3. And in either case the operating mechanism described below may be employed. In exemplary way the first alternative will be considered.

As shown in Fig. II, the rotary nut 11 is provided with a circumferential flange 11a, lying between the head 12 and a plate 13 which is made in two sections and secured to the head by means of screws 14, Fig. III. The nut is provided with a radial member or arm 15 that overlies the plate 13. A radial member or arm 16 is fixed to the upper end of the valve stem, an interval above the arm 15 on the nut. A lever 17 is by means of a pin 18 secured to the radially outward end of arm 16 on the valve stem, and, by means of pins 20 and 21, a link 19 is pivotally connected at its opposite ends to the arm 15 and lever 17, as shown. The center-to-center interval between pins 18 and 20 is equal to the corresponding interval between the pins 20 and 21, and thus it is that the link 19 and the body portion of the lever between pins 18 and 20 form a toggle linkage. The pin 20 projects downward from the link 19 and carries a rotary cam wheel 22 that cooperates with a guide 23. The guide 23 consists in this case in a curved, rigid wall extending upward from the head 12, and includes two guiding portions 23a and 23b of different curvatures. The guiding means 23 will be understood to be of compound curvature.

Fig. III shows the positions of the parts when the valve plug 3 is in closed, tightly seated position in the body 1. The arm 16 laterally abuts the end 24a of an arcuate wall 24 integral with and rising from the face of plate 13, and the toggle linkage is adjusted in such position that the wheel 22 lies at the outer end of portion 23b of the guide, with the two arms 15 and 16 extending at an angle of approximately forty-five degrees to one another. In opening the valve, the lever 17 is rotated in clockwise direction, it being remarked that the rotative stress may be applied either manually or powerfully. During the initial stage of rotation, the lever turns about the pin 18 as a center; the wheel 22 rolls over the guiding portion 23b, and the arm 16 remains in abutment with stop 24a. In consequence of such movement of the lever, the link 19 swings the arm 15 into the position indicated in Fig. IV. Thus, as the lever 17 swings through the initial portion of its range of swing and the wheel 22 rolls from one end of guiding portion 23b to the other, the nut 11, with which the arm 15 is integral, is rotated through approximately forty-five degrees with respect to the stationary arm 16 and valve stem 8. Such rotation of the nut causes the valve stem 8 to move downward (Fig. II) and unseat the valve plug. As the turning lever enters the position shown in Fig. II, the wheel 22, swinging arcuately about pin 18 as a center, moves into contact with the side of the nut 11 (note the arrow in Fig. IV), whereby further clockwise movement of the lever 17 about pin 18 is prevented. In the continued turning of the lever 17, the arms 15 and 16, remaining in right-angle relation, rotate in unison about the center of the valve stem 8, until during such rotation the arm 15 comes to abutment with end 24b of the stop 24. (Note Fig. V.) As the arm 15 so moves into abutment with the stop, the valve plug 3 reaches open position and is arrested. The portion 23a of the guide 23 is concentric with the center of the valve stem 8, and serves in conjunction with the side of nut 11 to prevent movement of the wheel 22, other than in circular course about the center of the valve stem. Thus, it will be seen that the arms 15 and 16 are positively maintained in right-angle relation while the nut 11 and stem 8 are rotated in unison, to turn the unseated valve plug 3 from closed to open position.

In closing the valve the above-described movements are effected in opposite directions and sequence. As the lever 17 is turned counterclockwise from the position shown in Fig. V, the lever 17 and arms 15 and 16, as a unit, first rotate through ninety degrees about the axis of valve stem 8 as a center, and turn the valve plug 3 from open to closed position. Then, as the valve plug reaches closed position, the turning arm 16 is arrested by the end 24a of the stop, and the continued swing of the lever 17 is about the center of pin 18, so that the linkage is moved from the position shown in Fig. IV to the position shown in Fig. III, and the nut 11 is rotated relatively to the threaded valve stem 8 in such manner as to draw the valve plug to its seat. Needless to say, the pin 18 engages the arm 16 with sliding fit, so that there is no mechanical interference with the slight vertical movement of the arm 16 and stem 8, incident to the seating and unseating of the valve plug.

Manifestly, my valve-operating mechanism may be operated by means of a hydraulic cylinder and plunger unit, or other type of motor.

It will be understood in general that, by virtue of the structure and principles of operation above described, many modifications and variations may be made by the engineer without departing from the essence of the invention defined in the appended claims. And it will be understood in particular that the term "nut" in the claims shall apply, either to the internally threaded member 11 shown, or to the externally threaded member alluded to.

I claim as my invention:

1. In mechanism for operating a valve including a valve-seat, a valve-member, and a valve-stem, said mechanism including a nut in threaded engagement with said valve-stem, a link pivotally connected to said nut at an interval radially outward from the axis of the nut, a link pivotally connected to said stem at an interval radially outward from the axis of the stem, said links being pivotally interconnected at a point spaced from the respective points of interconnection of said links with said nut and stem, said pivotally interconnected links being revoluble about the axis of said stem for rotating said stem and nut in unison, and means for powerfully moving said links angularly to one another, to effect rotation of said nut relatively to said stem.

2. The structure of claim 1, together with a guiding surface of compound curvature, and means carried by said pivotally interconnected links and cooperating with said guiding surface during the operation described.

3. The structure of claim 1, in which the last-mentioned means comprise a hand-lever organized with said links.

4. The structure of claim 1, in which said last-mentioned means comprises a hand-lever organized with said links, together with a guiding surface of compound curvature and means carried by said pivotally interconnected links and cooperating with said guiding surface.

5. In mechanism for operating a valve including a valve-seat, a valve-member, and a valve-stem, said mechanism including a nut in threaded engagement with said valve-stem, a radial member integrated with said valve-stem, a radial member integrated with said nut, and a linkage including two articulated members interconnecting said radial members, said radial members and said articulated members being revoluble as a unit about the axis of said stem to effect rotation of said valve-member, and said articulated members being angularly movable relative to one another to effect relative angular movement of said radial members, to effect relative rotation between said valve-stem and said nut, whereby said valve-member is axially shifted relatively to said valve-seat.

6. In mechanism for operating a valve including a valve-seat, a valve-member, and a valve-stem, said mechanism including a nut in threaded engagement with said valve-stem, a radial member integrated with said valve-stem, a radial member integrated with said nut, and a linkage including two articulated members interconnecting said radial members, said radial members and said articulated members being revoluble as a unit about the axis of said stem to effect rotation of said valve-member, and said articulated members being angularly movable relative to one another to effect relative angular movement of said radial members and relative rotation between said valve-stem and said nut, whereby said valve-member is axially shifted relatively to said valve-seat, and means cooperating with one of said radial members for limiting the revolution of the linkage in one direction and cooperating with the other of said radial members in limiting revolution in the opposite direction.

7. In mechanism for operating the stem of a valve, said mechanism including a nut in engagement with said stem, a radial member extending from said nut, a radial member extending from said stem, said radial members being rotatable in unison for turning said stem through a predetermined range of rotation, an abutment cooperating with one of said radial members at one end of said range of rotation, an abutment cooperating with the other of said radial members at the other end of said range of rotation, and means for angularly shifting one of said radial members relatively to the other while in engagement with its abutment, whereby said nut is rotated and said stem axially shifted.

THOR GANNESTAD.